Nov. 27, 1956 J. G. STREIFFERT 2,772,089
VARIABLE PITCH RADIAL TOOTH SPROCKET
Filed May 1, 1952 3 Sheets-Sheet 1

JOHN G. STREIFFERT
INVENTOR.

BY
ATTORNEYS

Nov. 27, 1956  J. G. STREIFFERT  2,772,089
VARIABLE PITCH RADIAL TOOTH SPROCKET
Filed May 1, 1952  3 Sheets-Sheet 2

JOHN G. STREIFFERT
INVENTOR.

BY
ATTORNEYS

Nov. 27, 1956  J. G. STREIFFERT  2,772,089
VARIABLE PITCH RADIAL TOOTH SPROCKET
Filed May 1, 1952  3 Sheets-Sheet 3
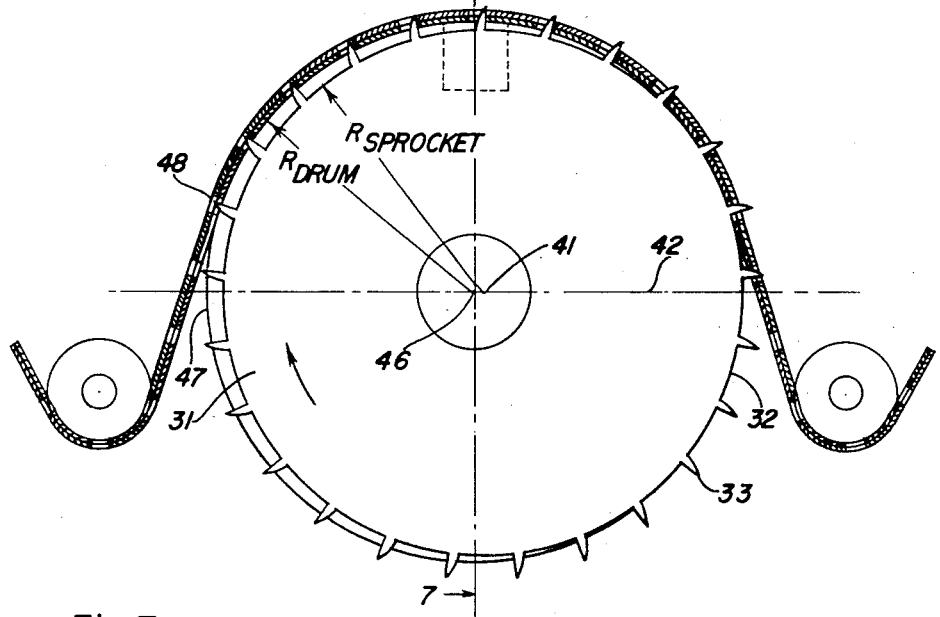
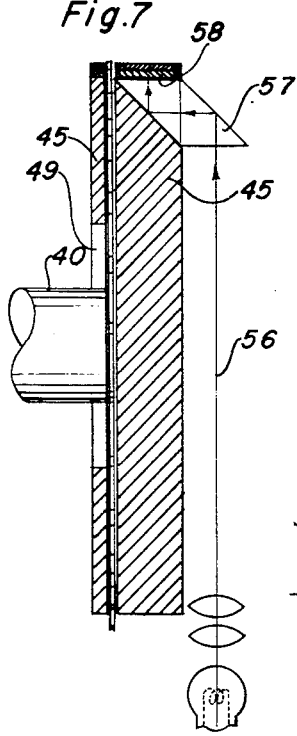
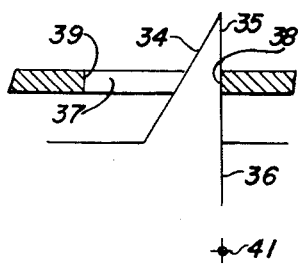
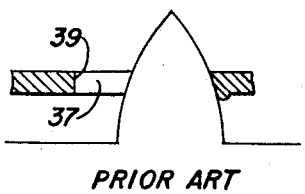
PRIOR ART
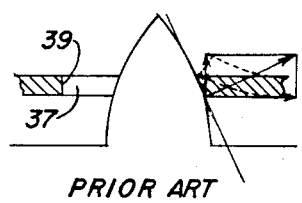
PRIOR ART
JOHN G. STREIFFERT
INVENTOR.
BY
ATTORNEYS

United States Patent Office 2,772,089
Patented Nov. 27, 1956

2,772,089

VARIABLE PITCH RADIAL TOOTH SPROCKET

John G. Streiffert, Rochester, N. Y., assignor to Eastman Kodak Company, Rochester, N. Y., a corporation of New Jersey Application May 1, 1952, Serial No. 285,501

4 Claims. (Cl. 271—2.3)

The present invention relates to a film-driving mechanism, and more particularly to a novel form of sprocket assembly for propelling films, of the perforated type, at a uniform rate.

It is well known that an ordinary sprocket can impart uniform continuous motion to film only if the film pitch happens to be identical with the socket pitch and the tooth profile is one which clears the path of the perforation as the film engages and disengages the sprocket. If the film pitch does not match the sprocket pitch exactly, only one tooth will be driving at any one instant, and, at the time of transfer of the load to the next, the film motion will not be uniform.

Various expedients have been employed to reduce this type of non-uniformity. In some cases, brute force is used to stretch the film so that it matches the sprocket or matches another film on which it is to be printed. This usually requires the application of inordinately high tensions or pressure on the film so that excessive wear of the film perforations and driving members is likely to occur. In other cases various forms of what may be called "shrinkage accommodation sprockets" have been proposed. Among the more promising of these sprockets have been those shown in the Elmer Patent 2,122,458, June 30, 1936; Mechau Patent 1,873,778, August 23, 1932; and an article by J. S. Chandler, Jour. SMPE, vol. 37, pp. 4164–4176, August 1941, entitled "Some theoretical considerations in the design of sprockets for continuous film movement."

The Elmer disclosure describes a sprocket whose base diameter was determined by the pitch of the longest film to be encountered, whereas the tooth profile was curved and intended to allow film of maximum shrinkage to slip back uniformly with respect to the base of the sprocket as it is stripped off the teeth. By this means films of minimum and maximum shrinkage will be driven without flutter. For the intermediate values of shrinkage, the film would be driven for part of each pitch length of travel at the speed of unshrunk film, and for the remainder of the pitch length at the speed of film of maximum shrinkage. If the sprocket were designed for a shrinkage range of 1%, the peak variation of velocity would be 1% for all intermediate values of shrinkage. The root mean square (R. M. S.) deviation of velocity commonly referred to as "flutter" would depend upon shrinkage because this determines the relative time the film is driven at each of the two speeds. For a shrinkage of 0.5% the times would be equal and the R. M. S. deviation would equal the peak deviation of 0.5%.

With the Mechau arrangement, the film is driven by a wafer-like sprocket and is supported by rotatable discs on either side of the sprocket. The discs are slightly larger in diameter than the base diameter of the sprocket, and are eccentrically mounted relative to the sprocket. This provides a continuously increasing effective sprocket radius as the film passes through its engagement with the sprocket. The presumption is that the effective sprocket pitch depends upon the effective radius. Film of any shrinkage is automatically driven in that region where the effective sprocket pitch most nearly matches the film pitch.

Since no mention was made of the manner of determining the optimum tooth profile, the Mechau specification was incomplete until a geometric analysis was published by Chandler in the above-mentioned article. Chandler, in his analysis, follows these lines: with the type of sprocket shown in the Mechau patent assume that the film is fed onto the sprocket at the point where the supporting discs are tangent to the base of the sprocket. The perforation will then describe an epicycloid curve relative to the sprocket base as it moves along the surface of the supporting member and away from the center of the sprocket. This epicycloid curve would be the correct tooth profile to drive unshrunk film. The sprocket and film would be in perfect mesh; i. e. each tooth would bear against each perforation. However, if the pitch of the film were either slightly shorter or slightly longer than that of the sprocket, then either the last tooth or the first tooth engaged with the film would be the only one which did any driving and the film motion would be non-uniform.

To achieve the variable pitch sprocket, it is necessary to modify the epicycloid curve, as described in the Chandler reference above and as shown schematically in Fig. 2, of an article by J. G. Streiffert in the December 1951 Jour. SMPTE entitled "Radial-toothed variable-pitch sprocket," to which reference may be had for various design and test procedures of the sprocket assembly of the present invention. When this modification is done, the effective pitch of the sprocket, i. e. the distance between the teeth along the film line, will continually decrease as the film passes from the tangent point to the point of disengagement along the supporting drum or stripper. The result is that any film whose shrinkage is within the range for which the sprocket is designed is automatically driven in that region where the effective sprocket pitch matches the film pitch.

Several of these variable pitch sprockets have been tried, particularly in 16 mm. contact and optical printers. While these sprockets handle the shrinkage range for which they were designed picture steadiness and sound flutter were not as good as was believed possible on the basis of the known precision of the film and mechanical parts involved.

It can readily be seen that accurate longitudinal registration of a film by means of a sprocket tooth which presents an inclined face to the edge of the perforation depends upon accurate control of the distance of the driven edge of the perforation from the center of the sprocket. For example, if the driven edge of the perforation were drawn down in the slot between the two supporting discs on either side of the sprocket, because of friction of the film on the teeth, then the film would not be correctly registered but would be advanced beyond its correct position.

In order to avoid such a possibility, a printer was designed having a sprocket assembly, as illustrated in Fig. 3 of the above-mentioned Streiffert article, in which the films were supported between the teeth as well as on either side. This was accomplished by recessing the sprocket inside the film supporting drum and allowing the sprocket teeth to protrude through slots made in the overhanging periphery of the drum. The drum was an integral member of pitch lengths greater in circumference than the sprocket and was engaged and driven by the sprocket in a gear-like manner. By this means the film was supported directly under the point where the perforations bore on the tooth face and was pushed uniformly up along the profile as the assembly rotated. Examination by means of a microscope and stroboscopic illumination of the action of the driven perforation under pressure of the driving tooth, revealed that the film was not set down against the drum but was sliding up on the inclined face of the tooth by an amount of variation from 0.001" to 0.003". Some of the causes of this are illustrated in Figs. 9 and 10. For example, in Fig. 9, the pressure of the tooth against the edge of the perforation tended to deform the edge as shown in Fig. 9. In addition, due to the arrangement of the forces of the tooth against the edge of the film perforation, as illustrated in Fig. 10, the film tended to creep up on the tooth as indicated in this figure.

An attempt was made to reduce these errors by providing an external hold down shoe of the same radius as the external surface of the film. While this resulted in substantial improvement, the picture steadiness still did not meet expectations.

With the above outlined studies as a background, it was realized that for accurate longitudinal registration of the film, the ideal driving face for the tooth would be one which lay on the plane normal to the film, as shown in Fig. 8. Essentially this would mean that the driving face of each tooth would lie on the radius of the sprocket. A driving face of this type would have several important advantages. It would produce no radial component of force on the film, thereby eliminating outward distortion of the perforation from this cause. It would bear squarely against the full thickness of the film instead of against the sharp irregular corner of the film. The position of the film on the face of the tooth would have very little effect on the longitudinal registration of the film. Such a tooth would, in many ways, be substantially the equivalent of a registering pin in an intermittent mechanism.

Under normal circumstances, the difficulty with using a tooth with a radial driving face is that it is impossible to get the film off the tooth because the involute curve described by the driven edge of the perforation, as it leaves the sprocket tangentially, cuts into the radial tooth, as shown in Fig. 13, page 533 of the above-mentioned Streiffert article. This difficulty can be circumvented by combining the radial tooth with the variable pitch concept.

In any variable pitch sprocket, the change in effective sprocket pitch is the result of a changing effective tooth velocity along the film line. In the case of the radial tooth variable pitch sprocket, as later described, the effective tooth velocity is a maximum when the effective tooth radius is a maximum, i. e. when the film is at the tip of the teeth, as shown at the left, Fig. 6, and is a minimum when the effective radius is a minimum, i. e., when the film is at the base of the teeth, as shown at the right, Fig. 6. At the same time, positioned between the points of maximum and minimum effective radius, the effective tooth velocity will be exactly equal to the lineal velocity at which film of a given shrinkage must be driven. To the left of this position the effective tooth velocity will be greater than that of the film; and to the right it will be less than that of the film. Thus, as a tooth travels through an arc of engagement it is at first traveling faster than the perforation. Although its effective velocity is decreasing, it overtakes the perforation and drives for one pitch length, whereupon the next tooth takes over the driving function. The first tooth continues to decrease in effective velocity and falls behind the driven edge of the perforation so that there is again a clearance between the driving face of the tooth and the perforation, as also shown at the right in Fig. 6.

This fact, namely, that the tooth falls behind the perforation as it rotates beyond the driving region, provides the answer to the problem of getting the film off the sprocket with radial teeth. The only requirement is that the shortest film which is to be accommodated, i. e. that film which requires the lowest lineal velocity, be kept in engagement with the tooth far enough beyond the region where it was driven to permit the tooth to fall far enough behind the perforation so that the film can be disengaged without interference, as is deemed apparent from an inspection of Fig. 6 of the present application. In practice, this means that the assembly must be designed so that the shortest film which is to be accommodated is driven at approximately the mid point of the arc of engagement. The remainder of the travel provides for clearance so that the film can be disengaged.

The present invention has, therefore, as its principal object the provision of a radial-tooth variable-pitch film feeding sprocket.

Another object of the invention is the provision of a sprocket of the type described which will move any film strip or strips, whose shrinkage is within the range for which the sprocket is designed, with the required uniformity of motion.

A further object of the invention is the provision of a film moving sprocket provided with film engaging teeth, each of which has a driving face which is in a plane on the radius of the sprocket so as to impart precise longitudinal registration of the films.

A still further object of the invention is the provision of a variable pitch sprocket which is obtained by supporting the film or films by means of appropriate decentered drums or discs, while the films are in engagement with the sprocket so as to provide effectively a variable velocity for the sprocket teeth to accommodate film shrinkage.

Yet another object of the invention is the provision of a variable-pitch radial-tooth sprocket which improves wear-life of both films and sprocket.

To these and other ends, the invention resides in certain improvements and combinations of parts all as will be hereinafter more fully described, the novel features being pointed out in the claims at the end of the specification.

In the drawings:

Fig. 6 is a side elevation view of still another modification of the invention;

Fig. 7 is a vertical sectional view through the sprocket shown in Fig. 6, and taken substantially on line 7—7 thereof, showing another arrangement of a single sprocket and stationary film supporting discs for use with a single perforated film;

Fig. 8 is an enlarged view of one of the radial teeth of the sprocket of the present invention, showing the relation of the driving face of the tooth with the center of the sprocket and the edge of the film perforation;

Figs. 9 and 10 show the relation of a sprocket tooth of the prior art with respect to the edge of the film perforation, and illustrating the distortions of the film caused by a sprocket tooth of the shape used prior to the present invention.

Similar reference numerals throughout the various views indicate the same parts.

Figure 1:
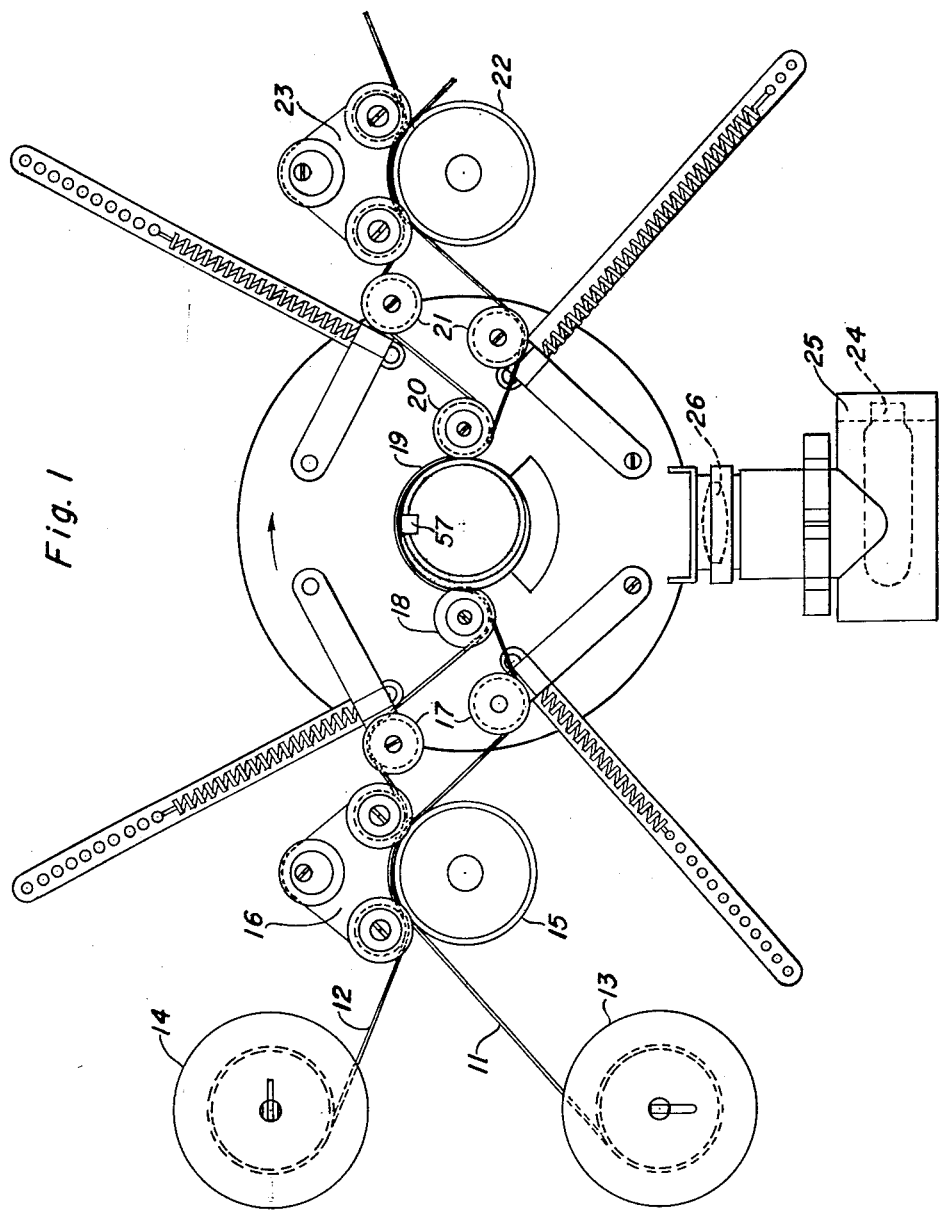
Fig. 1 is a side elevation view of one form of a photographic printer, showing the relation thereto of the radial-tooth variable-pitch sprocket constructed in accordance with the present invention.

Fig. 1 of the drawings shows a portion of a 16 mm. printer with which a 25 tooth sprocket of the present invention was used. As this printer, per se, forms no part of the present invention, only so much of the printer as is related to the sprocket of the present invention is illustrated and described, and the remaining parts of the printer may be of a standard or well known construction. In this printer, a negative film 11 and a positive film 12 are fed from reels 13 and 14 respectively. The two films are brought together and passed over the sprocket 15 against which the films are held by a roller assembly 16. After leaving the sprocket 15 the films are separated and passed respectively over spaced spring tension rollers 17 after which the films are again brought together and passed under a feed-on roller 18 which feeds the two films to the radial-tooth variable-pitch sprocket of the present invention, generally indicated by the numeral 19. After a wrap of approximately 150°, the two films are then passed under a feed-off roller 20, under and over vertically spaced spring tension rollers 21, and are finally brought together on the sprocket 22 and held thereon by roller assembly 23. After leaving the sprocket 22, the films 11 and 12 are again separated and wound up on separate take-up reels, not shown.

The printing light is supplied by a lamp 24 positioned below the sprocket assembly 19 and mounted in a housing 25, as best shown in Fig. 1. The light rays from the lamp 24 pass through a lens 26, and then are directed to a printing slot or aperture which is arranged in a manner to be later described in connection with the various embodiments.

Figure 3:
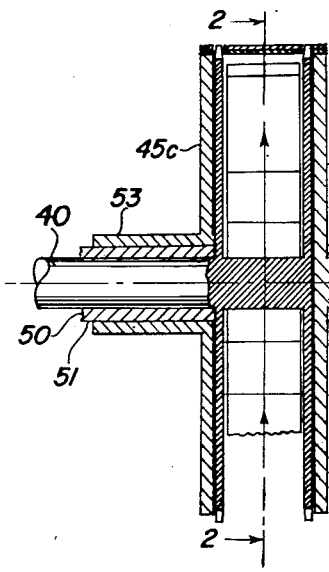
Fig. 3 is a vertical sectional view taken substantially on line 3—3 of Fig. 2, showing the arrangement of the sprocket parts and the relation of the sprocket to the film.
Figure 2:
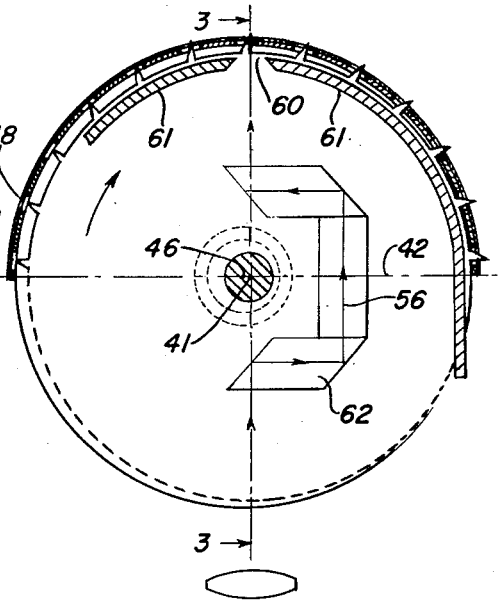
Fig. 2 is a vertical sectional view through one modification of the sprocket taken substantially on line 2—2 of Fig. 3, showing the sprocket of the present invention designed for use with double perforated film.

The radial-tooth variable-pitch sprocket 19 of the present invention is formed of tool steel to provide a thin body portion 31 of Fig. 6 having on the periphery thereof a plurality of equally spaced substantially triangular-shaped teeth generally indicated by the numeral 33. Each tooth is formed with an inclined rear face 34 which may be either straight or curved, and a front or driving face 35 which is in a plane lying on the radius 36 of the sprocket 19, as best shown in Fig. 8. Each tooth 33 is adapted, during a portion of its travel, to extend through a film perforation 37, and to engage, in driving relation, with the leading edge 38 of the perforation to propel the film, as is deemed apparent from an inspection of Fig. 8, the rear face 34 affording clearance between the tooth and the trailing edge 39 of the perforation. When a single sided sprocket is employed, as in the embodiment shown in Figs. 4–7, the sprocket is mounted on the end of and is driven as a unit with a drive shaft 40. In case a double sided sprocket arrangement is used for the double perforated films, as illustrated in Figs. 2 and 3, the shaft 40 is extended beyond the left sprocket a distance to provide a driving support for the right sprocket, the two sprockets being axially spaced on the shaft 40, Figs. 2 and 3, a distance equal to the lateral spacing of the two rows of film perforations, as is deemed apparent. In all cases, the center 41 of each sprocket is in alignment with the axis 42 of the supporting shaft 40.

When the sprocket assembly of the present invention is used to move the two films 11 and 12, the films are supported adjacent the sprocket, or sprockets, by means of suitable flat or thin supporting members or drums, generally indicated by the numerals 45. In all cases, the two supporting members are of equal diameter, but have a diameter which is slightly larger than the base diameter of the sprocket, and are eccentrically mounted relative to the sprocket. To secure this eccentricity or decentering, the drums or supporting members are moved slightly to the left, as viewed in Figs. 2, 4 and 6, so that the centers 46 of these discs are arranged on the same horizontal axis of but slightly to the left of the center 41 of the sprocket. The result is that the supporting members 45 are decentered relative to the sprocket, and such decentering is in the direction of the feed-on or left side of the sprocket, as is deemed apparent from an inspection of Figs. 2, 4 and 6. With this arrangement, the peripheries 47 of the supporting members or drums 45, at the feed-on point, are spaced beyond and laterally of the sprocket periphery 32, while, at the take-off point, the peripheries 47 of the members 45 are tangent to the sprocket periphery 32 of the sprocket, as clearly illustrated in Figs. 2 and 6.

Such decentering of the supporting members 45 provides the desirable variable-pitch arrangement described above. It will be apparent from Figs. 2, 4 and 6 of the present application, that when the films 11 and 12 are fed from the left onto the supporting members 45, only the tips 48 of the sprocket teeth 33 extend into the film perforations or apertures 37. Also, the plane driving face or edge 35 of the tooth adjacent the feed-on point is out of engagement with the leading edge 38 of the adjacent perforation. Now, due to the decentering arrangement, the tooth velocity for some distance beyond the point of feed-on will exceed the velocity of the films, with the result that the tooth will gradually overtake the film perforations at a point generally shown near the top of the sprocket in Figs. 2, 4, 6, but which point may be anywhere between the point of feed-on and the top, depending on film shrinkage. At this time the front edge 35 of a tooth will move into driving relation with the leading edge 38 of the cooperating perforation to drive the film. Thus, as each tooth travels through an arc from the feed-on point to the top of the sprocket, the tooth moves faster than the film and finally catches up and engages the leading edge of the film perforation. The tooth then drives for one pitch length, whereupon the next tooth takes over the driving function. Also, due to the decentering arrangement, as the tooth passed from the top of the sprocket to the right or take-off position, the tooth velocity gradually falls below that of the films. The result is that the edge 38 of the perforation gradually pulls away or ahead of the edge 35 of the sprocket. Finally, when the point of take-off has been reached, the edge 38 of the perforation has been moved a sufficient distance ahead of the edge 35 of the tooth to permit free and easy stripping or movement of the film from the sprocket without interference from the sprocket tooth.

The specific arrangement of the supporting members 45 depends, of course, on the particular sprocket and film arrangements employed; i. e. whether a single or double sprocket, and whether the supporting members are stationary or rotatable. The simplest arrangement is illustrated in Fig. 7, in which a pair of stationary film supporting members 45 is arranged on opposite sides of the sprocket 19. The left member 45 is relatively thin and is formed with an aperture 49 through which the drive shaft 40 extends. The right member 45, on the other hand, is much thicker than the left member as is clearly illustrated in Fig. 7. In this embodiment the members 45 support the films for the full lateral distance thereof on opposite sides of the perforations, as is deemed apparent from an inspection of Fig. 7.

Figure 5:
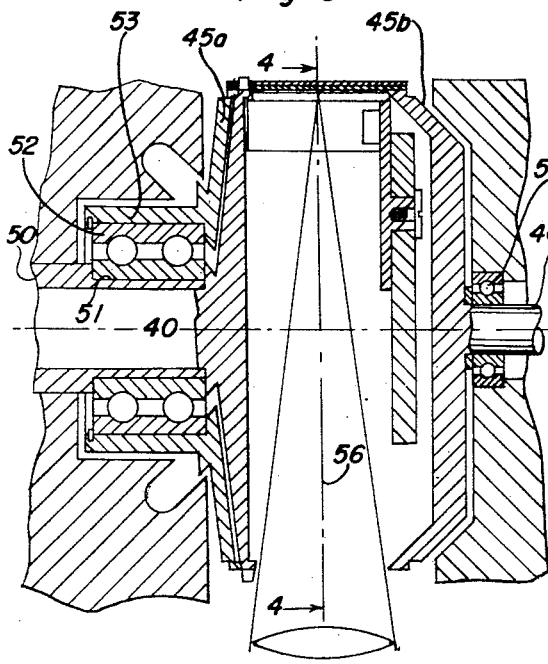
Fig. 5 is a vertical sectional view taken substantially on line 5—5 of Fig. 4 showing the relation of the sprocket parts to the single perforated film.
Figure 4:
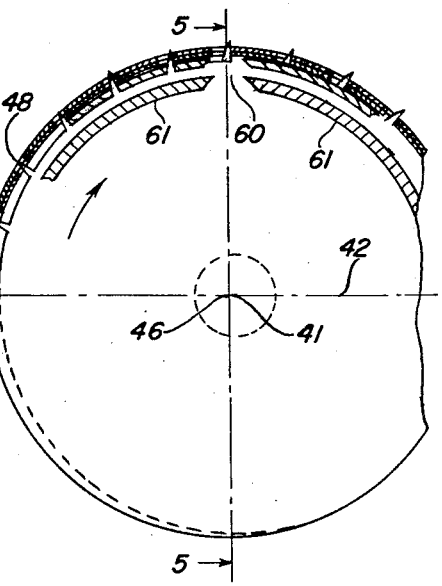
Fig. 4 is a vertical sectional view similar to Fig. 2 and taken substantially on line 4—4 of Fig. 5, showing another modification of the sprocket to be used with a single perforated film, but in which the film is supported by the rotatable discs arranged only at the edges of the film.

However, in the sprocket arrangement illustrated in Figs. 4 and 5, the supporting members are freely mounted so that they will be rotated by the moving film strips. In this arrangement the supporting members engage and support the films 11 and 12 only at their marginal edges, as best shown in Fig. 5. To secure this result, the drive shaft 40 has mounted thereon a bushing 50 the outer surface 51 of which has its center at axis 46 which is eccentric or decentered relative to the inner surface of the bushing and hence to shaft 40, as clearly illustrated in Fig. 4. This eccentric surface 51 has mounted thereon anti-friction bearings 52 which support an axially extending annular-shaped sleeve 53 of the left supporting member 45a. The right supporting member 45b, Fig. 5, is carried by a supporting shaft 40a which is mounted for free rotation on an anti-friction bearing 54. The members 45a and 45b are of equal diameter but are of slightly larger diameter than the base diameter of the sprocket. Also, member 45b is concentric with member 45a and the two supporting members are eccentric with or decentered relative to the sprocket. To secure the proper eccentric relation of the member 45a, the axis of shaft 40a is in alignment with the decentered axis 46 of member 45a.

In the arrangement illustrated in Fig. 3, the sprocket and supporting member arrangement is used to move double perforated films. To secure this result, shaft 40, Fig. 3, is extended to the right of the left sprocket, and supports the second sprocket which is spaced to the right of the left sprocket a distance equal to the lateral spacing of the two rows of film perforations. In this embodiment, the sleeve 53 of the left supporting member 45c is supported directly on and rotates relative to eccentric surface 51 of the sleeve 50. Of course, bearings similar to 52 and 54, could be used if desired with the arrangement illustrated in Fig. 3, so as to insure freedom of rotation of the supporting members 45c and 45d. In the arrangement shown in Fig. 3, the members 45c and 45d are also of equal size and are concentric relative to each other, but are eccentric or decentered relative to the sprocket, and are rotated by the moving films about the decentered axis 46, as indicated in Fig. 2. The right member 45d has a shaft 40b which is carried by a bushing 55 which is in alignment with axis 46 of the left member 45c so that the members are concentric with each other, but eccentric relative to the sprocket.

Thus, in all the above-described cases the film supporting members are decentered horizontally relative to the sprocket so that at the feed-on end, each sprocket tooth will have a velocity greater than the moving film, then an equal velocity so as to drive the film, and finally a decreasing velocity to disconnect the tooth from the film perforations to permit disengagement of the film without interference from the sprocket tooth. In the embodiment in Figs. 6 and 7, the film supporting members are stationary, but in the other two embodiments these supporting members are rotated by the moving films.

In order to print the image of the negative film 11 onto positive film 12, the light rays 56 from the lamp 24 are directed to a light aperture or gate preferably positioned adjacent the top of the assembly and within the latter. As the supporting members 45 of Fig. 7 are positioned on both sides of the sprocket 19, the lamp 24 is axially spaced therefrom or to the right of the assembly as clearly illustrated at the bottom of Fig. 7. In order to direct the light rays 56 to the films, a double reflecting prism 57 is positioned in the path of the light rays 56 and directs the rays to a point inside the right supporting member 45 and then radially through a slot 58 which may be formed either in the right hand stationary member 45 or in the top surface of the prism 57. Also, the light aperture may be formed at any suitable point in the optical system ahead of the member 45. As the formation of such light apertures is well known, they are not further illustrated or described. However, with the single sprocket arrangement illustrated in Fig. 5, the light rays 56 may be directed upward between the axially spaced supporting members 45a and 45b, as is clearly illustrated in Fig. 5. The light rays are directed through a light aperture 60 formed between a pair of light masks 61 arranged as illustrated in Fig. 4.

On the other hand, in the double sprocket arrangement of Fig. 3, the presence of the shaft 40 between the two sprockets will prevent the directing of the light rays in the manner illustrated in Fig. 5. The result is that with the arrangement of Figs. 2 and 3, means must be provided for directing the light rays around the shaft 40 between the two sprockets. To secure this result, a prism arrangement 62, shown in Fig. 2, directs the light in the manner shown in this figure so as to by-pass shaft 40. As such prism arrangements are well known, further details are not deemed necessary. Also, in this embodiment, light masks 61 and a light aperture 60 are provided so that the light rays may print the image of the negative film onto the positive film.

While the above-described arrangements have been illustrated in connection with a continuous printer, the structure is admirably adapted for other uses. Optical printing would presumably benefit about the same degree as contact printing. In this case, two precision sprockets, preferably on the same shaft would be required, but each would be designed for optimum performance in the shrinkage range it had to accommodate.

In general, such sprockets designed for sound recorders or reproducers would be larger in diameter than the conventionally used drum drives. It is believed that filtered drives for such sprockets could be designed which would be substantially free of "wow" and would be much more reliable and easier to maintain than drum drives. High speed continuous cameras and projectors would be improved markedly by such a sprocket, it is believed.

It might be thought that a shrinkage accommodation printer, such as the one described, might be used to expose short-pitched duplicate negatives from normal pitched master positives. While it might be possible to design a sprocket which would accommodate the pitches involved, the procedure is not to be recommended because of the large amount of slippage which would occur between the films. If, however, a printer were equipped with an auxiliary lamphouse so that the films could be illuminated either from the outside or inside the sprocket, then such duplicate negatives could be made by running the normal-pitch master positive on the outside and the short-pitch duplicate negative stock on the inside, and the slippage would be a minimum.

It is deemed apparent from the above description that the radial-tooth variable-pitch sprocket of the present invention not only will improve the longitudinal registration, but will also accommodate for shrinkage of the films and will provide improved uniformity of film movement. In addition, the arrangement permits free and easy disengagement of the films from the sprocket without interference from the sprocket teeth.

In the specific tooth embodiment illustrated in Fig. 8, the rear face 34 is shown as straight; but, as mentioned above, the face 34 may be curved. Also, it is not necessary that the entire front face 35 be straight and on a radius of the sprocket. Fig. 8 is merely illustrative of one suitable form of tooth design. The only requirement is that at least the film driving or engaging portion or area of face 35 must be straight and lie on a sprocket radius. The upper section of face 35 above the driving portion may be curved, if desired. Also, the tension of the film on the left hand side of the sprocket should be greater than that on the right hand side so as to hold the leading edges 38 of the films in tight engagement with the tooth face 35 during the driving operation.

During the printing operation, the sprocket 19 is driven in the direction illustrated by the arrow to drive the films. However, the sprocket 19 is also admirably adapted to be used as a hold-back sprocket (instead of a drive sprocket) by reversing the direction of rotation and film travel, but still keeping tension on the left hand side greater than that on the right hand side. While the arc of engagement has been designated as 150 to 180°, as shown in the figures, the actual arc of contact depends on the size of the sprocket and shrinkage range to be accommodated.

While certain embodiments of the invention have been described, it is to be understood that the inventive idea may be carried out in a number of ways. Therefore, this application is not to be limited to the precise details described, but is intended to cover all variations and modifications which fall within the scope of the appended claims.

What I claim and desire to secure by Letters Patent of the United States is:

1. A variable-pitch film feeding sprocket assembly for use with a film strip having a single row of perforations arranged adjacent one edge thereof comprising in combination, a thin sprocket formed with film propelling teeth, each tooth having a flat planar film driving face which lies on a radius of said sprocket, means for supporting and rotating said sprocket, a thin film supporting member positioned on one side of said sprocket, and a thicker film supporting member positioned on the other side of said sprocket and cooperating with said first member to support said film adjacent and on opposite sides of said sprocket, said members being of equal diameter but slightly larger than the base diameter of said sprocket and arranged concentrically relative to each other but eccentricaly relative to said sprocket in the direction of the feed-on side of said sprocket.

2. A variable-pitch film feeding sprocket assembly for use with a film strip having a single row of perforations arranged adjacent one edge thereof comprising, in combination, a thin sprocket formed with film propelling teeth, each tooth having a flat planar film driving face which lies on a radius of said sprocket, means for supporting and rotating said sprocket, a circular thin film supporting member positioned on one side of said sprocket to support said strip adjacent one marginal edge thereof, a second circular thin film supporting member positioned to engage and support said strip adjacent the other marginal edge thereof, said members being of equal diameter but of a slightly larger diameter than the base diameter of said sprocket, and means for separately and independently supporting said members rotatably in concentric relation with each other but in an eccentric relation with said sprocket so that said members will be rotated solely by the moving film strip, said members being eccentric to said sprocket in the direction of the feed-on side of said sprocket.

3. A variable-pitch film feeding sprocket assembly for use with a film strip having a row of perforations adjacent each marginal edge thereof, comprising, in combination, a drive shaft, a pair of thin sprockets secured to said shaft and spaced axially thereof a distance equal to the lateral spacings of said rows so that the sprockets will engage in the perforations of both rows to propel the film strip, a thin circular film-supporting member positioned between one row and the adjacent marginal edge of the strip to support the latter adjacent one edge only, a second thin circular film-supporting member positioned between the other row and the other marginal edge to support said film strip adjacent said other marginal edge, said members being equal in diameter but of a diameter slightly larger than the base diameter of said sprocket, and means of mounting said discs for rotation by said film about an axis which is decentered from the axis of said sprocket in the direction toward the feed-on side of said sprocket.

4. A variable-pitch film feeding sprocket assembly for use with a film strip having a row of perforations adjacent each marginal edge thereof, comprising, in combination, a drive shaft, a pair of thin sprockets secured to said shaft and spaced axially thereof a distance equal to the lateral spacings of said rows so that the sprockets will engage in the perforations of both rows to propel the film strip, a thin circular film-supporting member positioned between one row and the adjacent marginal edge of the strip to support the latter adjacent one edge only, a second thin circular film-supporting member positioned between the other row and the other marginal edge to support said film strip adjacent said other marginal edge, said members being equal in diameter but of a diameter slightly larger than the base diameter of said sprocket, and means for separately and independently mounting said member for free rotation by the strip propelled by said sprockets, said mounting means for said members being concentric to each other but decentered relative to said sprocket to offset said members relative to said sprocket in the direction of the feed-on side of said sprocket.

References Cited in the file of this patent

UNITED STATES PATENTS

| | | |
|---|---|---|
| 1,873,778 | Mechau | Aug. 23, 1932 |
| 1,896,542 | Evans | Feb. 7, 1933 |
| 2,003,029 | Albersheim | May 28, 1935 |
| 2,098,371 | Bedford | Nov. 9, 1937 |
| 2,122,458 | Elmer | July 5, 1938 |
| 2,133,820 | Kellogg | Oct. 18, 1938 |
| 2,155,518 | Wehner | Apr. 25, 1939 |
| 2,240,083 | Tondreau | Apr. 29, 1941 |
| 2,268,891 | Mueller | Jan. 6, 1942 |
| 2,484,446 | Capstaff | Oct. 11, 1949 |
| 2,487,870 | Harrison | Nov. 15, 1949 |

FOREIGN PATENTS

| | | |
|---|---|---|
| 296,325 | Italy | May 13, 1932 |
| 470,076 | Canada | Dec. 12, 1950 |